US011849662B2

(12) United States Patent
Henry (10) Patent No.: US 11,849,662 B2
(45) Date of Patent: Dec. 26, 2023

(54) SYSTEM AND METHOD FOR IDENTIFYING SOIL LAYERS WITHIN AN AGRICULTURAL FIELD

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 403 days.

(21) Appl. No.: 17/203,062

(22) Filed: Mar. 16, 2021

(65) Prior Publication Data

US 2022/0295688 A1   Sep. 22, 2022

(51) Int. Cl.
| | |
|---|---|
| *A01B 79/00* | (2006.01) |
| *A01B 13/14* | (2006.01) |
| *A01B 63/00* | (2006.01) |
| *G01S 13/88* | (2006.01) |
| *G01V 3/10* | (2006.01) |
| *A01B 3/24* | (2006.01) |
| *A01B 63/32* | (2006.01) |

(52) U.S. Cl.
CPC ............ *A01B 79/005* (2013.01); *A01B 13/14* (2013.01); *A01B 63/008* (2013.01); *G01S 13/885* (2013.01); *G01V 3/10* (2013.01); *A01B 3/24* (2013.01); *A01B 63/32* (2013.01)

(58) Field of Classification Search
CPC ..... A01B 79/005; A01B 13/14; A01B 63/008; A01B 63/32; A01B 3/24; G01S 13/885; G01V 3/10–15
See application file for complete search history.

(56) References Cited

U.S. PATENT DOCUMENTS

| | | | |
|---|---|---|---|
| 7,254,485 | B2 | 8/2007 | Rooney et al. |
| 9,265,192 | B2 | 2/2016 | Chan et al. |
| 10,262,413 | B2 | 4/2019 | Strnad et al. |
| 10,345,284 | B2 | 7/2019 | Pregesbauer |

(Continued)

FOREIGN PATENT DOCUMENTS

| | | |
|---|---|---|
| EP | 3424287 A1 | 1/2019 |
| RU | 2537908 C2 | 1/2015 |

(Continued)

OTHER PUBLICATIONS

Extended European Search Report for corresponding EP Application No. 22161729 dated Aug. 17, 2022 (7 pages).

(Continued)

*Primary Examiner* — Tara Mayo
(74) *Attorney, Agent, or Firm* — Rebecca Henkel; Rickard DeMille (57) ABSTRACT

A system for identifying soil layers within a field includes a non-contact-based sensor configured to capture data indicative of a subsurface soil layer within the field. Furthermore, the system includes a computing system communicatively coupled to the non-contact-based sensor. In this respect, the computing system is configured to determine a thickness of the subsurface soil layer in a vertical direction based on the data captured by the non-contact-based sensor. Moreover, the computing system is configured to identify the subsurface soil layer as one of a compaction layer or a B-horizon based on the determined thickness.

16 Claims, 6 Drawing Sheets

(56) References Cited

U.S. PATENT DOCUMENTS

| | | |
|---|---|---|
| 10,371,814 B2 | 8/2019 | Chan et al. |
| 2015/0268218 A1* | 9/2015 | Troxler .................. G01N 9/24 342/21 |
| 2018/0108123 A1* | 4/2018 | Baurer et al. .......... G06V 20/56 |
| 2019/0147094 A1 | 5/2019 | Zhan et al. |
| 2019/0320574 A1 | 10/2019 | Andrejuk et al. |
| 2020/0000006 A1 | 1/2020 | McDonald et al. |
| 2020/0375085 A1 | 12/2020 | Strnad et al. |
| 2021/0105931 A1 | 4/2021 | Anderson, Jr. et al. |
| 2022/0022362 A1 | 1/2022 | Anderson, Jr. et al. |

FOREIGN PATENT DOCUMENTS

| | | |
|---|---|---|
| WO | WO 2021021508 A1 | 2/2021 |
| WO | WO2022/072345 A1 | 4/2022 |

OTHER PUBLICATIONS

"Geoprospectors", Agriculture, dated Apr. 19, 2017, (5 pages) http://www.geoprospectors.com/gb/products-services/agriculture/.

"AgXtend", SoilXplorer Advanced Soil Sensing Solutions, dated Mar. 18, 2020, (5 pages) https://agxtend.com/products/soilxplorer.

* cited by examiner

SYSTEM AND METHOD FOR IDENTIFYING SOIL LAYERS WITHIN AN AGRICULTURAL FIELD

FIELD OF THE INVENTION

The present disclosure generally relates to systems and methods for identifying characteristics of an agricultural field and, more particularly, to systems and methods for identifying subsurface soil layers with an agricultural field.

BACKGROUND OF THE INVENTION

It is well known that, to attain the best agricultural performance from a piece of land, a farmer must cultivate the soil, typically through a tillage operation. Common tillage operations include plowing, harrowing, and subsoiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

When performing certain tillage operations, it is generally desirable to break up any subsurface soil compaction layers that have been formed due to vehicle traffic, ponding, and/or the like. As such, during such tillage operations, shanks or other ground-penetrating tools supported on the tillage implement are pulled through the soil to fracture the compaction layer(s). Furthermore, it is also generally desirable that the shanks avoid certain subsurface soil layers, such as the B-horizon. In this respect, systems have been developed that allow subsurface soil layers to be detected. However, such systems are unable to distinguish between the different types of subsurface soil layers.

Accordingly, an improved system and method for identifying subsurface soil layers within a field would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for identifying soil layers within a field. The system includes a non-contact-based sensor configured to capture data indicative of a subsurface soil layer within the field. Furthermore, the system includes a computing system communicatively coupled to the non-contact-based sensor. In this respect, the computing system is configured to determine a thickness of the subsurface soil layer in a vertical direction based on the data captured by the non-contact-based sensor. Moreover, the computing system is configured to identify the subsurface soil layer as one of a compaction layer or a B-horizon based on the determined thickness.

In another aspect, the present subject matter is directed to a tillage implement. The tillage implement includes a frame and a shank supported on the frame, with the shank configured to penetrate soil within a field to a penetration depth. Additionally, the tillage implement includes a sensor configured to capture data indicative of a subsurface soil layer within the field and a computing system communicatively coupled to the sensor. As such, the computing system is configured to determine a thickness of the subsurface soil layer in a vertical direction based on the data captured by the sensor. Furthermore, the computing system is configured to identify the subsurface soil layer as one of a compaction layer or a B-horizon based on the determined thickness. In addition, the computing system is configured to control the penetration depth of the shank based on the identification of the subsurface soil layer.

In a further aspect, the present subject matter is directed to a method for identifying soil layers within a field as an agricultural implement travels across the field. The agricultural implement, in turn, includes a ground-penetrating tool configured to penetrate soil within a field to a penetration depth. The method includes receiving, with a computing system, non-contact-based sensor data indicative of a subsurface soil layer within the field. Furthermore, the method includes determining, with the computing system, a thickness of the subsurface soil layer in a vertical direction based on the received non-contact-based sensor data. Additionally, the method includes identifying, with the computing system, the subsurface soil layer as one of a compaction layer or a B-horizon based on the determined thickness. Moreover, the method includes controlling, with the computing system, the penetration depth of the ground-penetrating tool based on the identification of the subsurface soil layer.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for identifying soil layers within a field. As will be described below, an agricultural field may include various subsurface soil layers. For example, a compaction layer is a subsurface layer of soil that breaks down and compacts (e.g., due to vehicle traffic, ponding, and/or the like), thereby becoming much denser than the surrounding soil. It is generally desirable to break up any compaction layers during tillage operations to improve seedbed quality. Conversely, the B-horizon is a subsurface layer of clay, iron oxides, gravel, and/or the like positioned below the seedbed that is generally unsuitable for planting crops. In this respect, it generally undesirable for the tool(s) of a tillage implement to penetrate into the B-horizon.

In several embodiments, the disclosed system may be configured to identify a subsurface soil layer as either a compaction layer or the B-horizon. More specifically, the system may include a non-contact-based sensor configured to capture data indicative of a subsurface soil layer present within the field. In one embodiment, the non-contact-based sensor may include a ground-penetrating radar (GPR) sensing device and an electromagnetic induction (EMI) sensing device. As such, a computing system may determine the thickness of the subsurface soil layer in the vertical direction based on the data captured by the non-contact-based sensor. Thereafter, the computing system may identify the subsurface soil layer as either a compaction layer or the B-horizon based on the determined thickness. For example, in some embodiments, the computing system may compare the determined thickness to a predetermined thickness value. When the determined thickness falls below the predetermined thickness value, the computing system may identify the subsurface soil layer as a compaction layer. Conversely, when the determined thickness exceeds the predetermined thickness value, the computing system may identify the subsurface soil layer as the B-horizon.

Identifying subsurface soil layers based on thickness generally improves tillage operations. More specifically, the depths of compaction layers and the B-horizon may vary greatly within a field and between different fields. However, the B-horizon is generally much thicker than a compaction layer. As such, determining the thickness of a subsurface soil layer allows for identification of the layer as either a compaction layer or the B-horizon. Thereafter, the tool(s) (e.g., a shank(s)) of the tillage implement may be controlled based on the identification of the subsurface soil layer. For example, when a compaction layer is identified, the penetration depth(s) of the tool(s) may be adjusted to ensure that the tool(s) penetrate through the compaction layer, thereby breaking up the compaction layer. Conversely, when the B-horizon is identified, the depth(s) of the tool(s) may be adjusted to ensure that the tool(s) do not penetrate into the B-horizon, thereby preventing the clay within the B-horizon from being mixed into the seedbed. Thus, the disclosed systems and methods generally allow for more accurate depth control of tillage implement tools, which improves the effectiveness of the tillage operation and the subsequent agricultural performance of the field.

Figure 1:
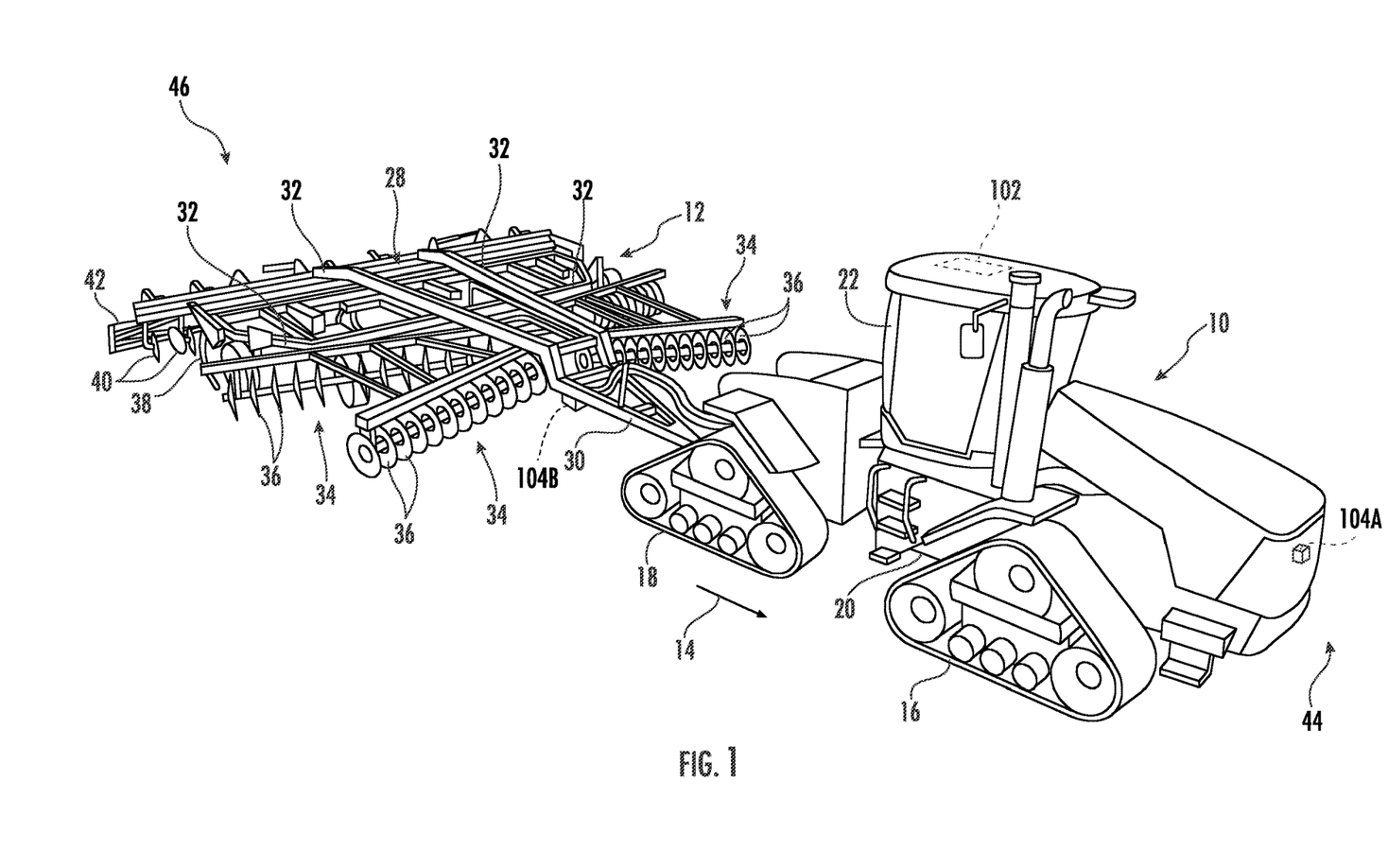
FIG. 1 illustrates a perspective view of one embodiment of a work vehicle towing an implement in accordance with aspects of the present subject matter.

Referring now to the drawings, FIG. 1 illustrates a perspective view of one embodiment of a work vehicle 10 and an associated agricultural implement 12 in accordance with aspects of the present subject matter. In general, the work vehicle 10 may be configured to tow the implement 12 across a field in a direction of travel (indicated by arrow 14). As such, in one embodiment, the work vehicle 10 may be configured as an agricultural tractor and the implement 12 may be configured as a tillage implement. However, in other embodiments, the work vehicle 10 may be configured as any other suitable work vehicle. Similarly, the implement 12 may be configured as any other suitable agricultural implement.

As shown, the work vehicle 10 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface) for permitting an operator to control the operation of one or more components of the work vehicle 10 and/or one or more components of the implement 12.

Additionally, as shown in FIG. 1, the implement 12 may generally include a frame 28 configured to be towed by the vehicle 10 via a pull hitch or tow bar 30 in the direction of travel 14. In general, the frame 28 may include a plurality of structural frame members 32, such as beams, bars, and/or the like, configured to support or couple to a plurality of components. As such, the frame 28 may be configured to support a plurality of ground-engaging and/or ground-penetrating tools, such as a plurality of shanks, disk blades, leveling blades, basket assemblies, tines, spikes, and/or the like. In one embodiment, the various ground-engaging and/or ground-penetrating tools may be configured to perform a tillage operation or any other suitable ground-engaging operation on the field across which the implement 12 is being towed. For example, in the illustrated embodiment, the frame 28 is configured to support various gangs 34 of disk blades 36, a plurality of ground-penetrating shanks 38, a plurality of leveling blades 40, and a plurality of crumbler wheels or basket assemblies 42. However, in alternative embodiments, the frame 28 may be configured to support any other suitable ground-engaging tool(s), ground-penetrating tool(s), or combinations of such tools.

Moreover, a location sensor 102 may be provided in operative association with the vehicle 10 and/or the implement 12. For instance, as shown in FIG. 1, the location sensor 102 is installed on or within the vehicle 10. However, in other embodiments, the location sensor 102 may be installed on or within the implement 12. In general, the location sensor 102 may be configured to determine the current location of the vehicle 10 and/or the implement 12 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 102 may be transmitted to a computing system of the vehicle 10 and/or the implement 12 (e.g., in the form coordinates) and stored within the computing system's memory for subsequent processing and/or analysis. For instance, based on the known dimensional configuration and/or relative positioning between the vehicle 10 and the implement 12, the determined location from the location sensor 102 may be used to geo-locate the implement 12 within the field.

Furthermore, one or more soil sensors may be provided in operative association with the vehicle 10 and/or the implement 12. In general, the soil sensor(s) may be configured to capture data indicative of a subsurface soil layer present within the field as the vehicle/implement 10/12 travels across the field. As will be described below, the data captured by the soil sensor may be used to identify a detected subsurface soil layer as either a compaction layer or the B-horizon. In this respect, the soil sensor may be a non-contact-based sensor installed or otherwise supported on the vehicle 10 and/or the implement 12 such that the sensor 104 has a field of view or sensor detection range directed towards a portion of the field adjacent to the vehicle/implement 10/12. For example, as shown in FIG. 1, in one embodiment, a first soil sensor 104A may be mounted on a forward end 44 of the work vehicle 10 to capture data associated with a portion of the soil within the field disposed in front of the vehicle 10 relative to the direction of travel 14. Moreover, as shown in FIG. 1, in one embodiment, a second soil sensor 104B may be mounted on the implement 12 to capture data associated with a portion of the soil within the field disposed in front of the implement 12 and aft of the vehicle 10 relative to the direction of travel 14. However, in alternative embodiments, the soil sensor(s) may be installed at any other suitable location(s) on the vehicle 10 and/or the implement 12. Additionally, the vehicle/implement 10/12 may include any suitable number of soil sensors, such as single soil sensor or three or more soil sensors.

Figure 2:
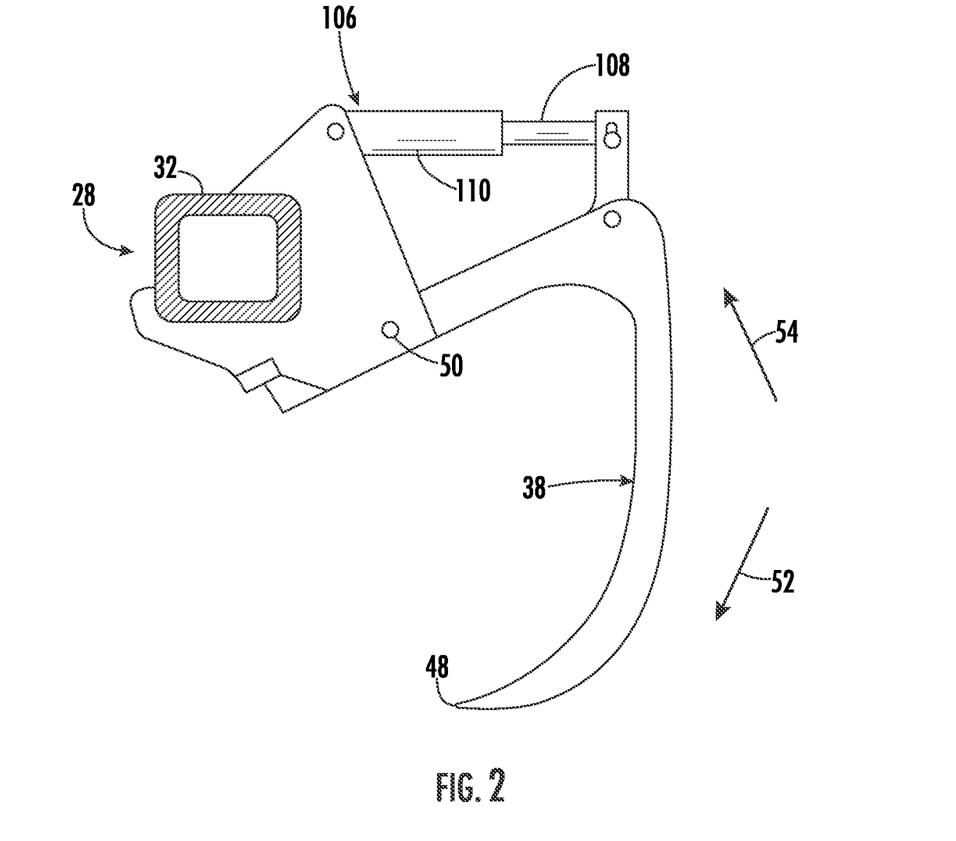
FIG. 2 illustrates a side view of one embodiment of a shank of an agricultural implement in accordance with aspects of the present subject matter.

Referring now to FIG. 2, a side view of one embodiment of one of the shanks 38 of the implement 12 described above with reference to FIG. 1 is illustrated in accordance with aspects of the present subject matter. As indicated above, the shanks 38 may be configured to till or otherwise cultivate the soil. In this regard, one end of each shank 38 may include a tip 48 configured to penetrate the soil within the field to a penetration depth as the implement 12 is pulled across the field. The opposed end of each shank 38 may be pivotably coupled to the implement frame 28, such as at a pivot point 50. As such, each shank 38 may be configured to pivot relative to the frame 28 in a manner that adjusts its penetration depth. In one embodiment, the various shanks 38 of the implement 12 may be configured as rippers. However, in alternative embodiments, the shanks 38 may be configured as chisels, sweeps, tines, or any other suitable type of shanks. Furthermore, the other shanks coupled to the frame 28 may have the same or a similar configuration to as the shank 38 shown in FIG. 2.

In several embodiments, the implement 12 may include one or more ground-penetrating tool actuators 106, with each actuator 106 coupled between the frame 28 and each shank 38. In general, each actuator 106 may be configured to move or otherwise adjust the orientation or position of the corresponding shank 38 relative to the implement frame 28 in a manner that adjusts the penetration depth of the shank 38. More specifically, as shown in the illustrated embodiment, a first end of each actuator 106 (e.g., a rod 108 of each actuator 106) is coupled to the corresponding shank 38, while a second end of each actuator 106 (e.g., a cylinder 110 of each actuator 106) is coupled to the frame 28. As such, the rod 108 of each actuator 106 may be configured to extend relative to the corresponding cylinder 110 to pivot the corresponding shank 38 relative to the frame 28 in a first pivot direction (indicated by arrow 52), thereby increasing the penetration depth of the shank 38. Conversely, the rod 108 of each actuator 106 may be configured to retract relative to the corresponding cylinder 110 to pivot the corresponding shank 38 relative to the frame 28 in a second pivot direction (indicated by arrow 54), thereby decreasing the penetration depth of the shank 38. In the illustrated embodiment, each actuator 106 corresponds to a fluid-driven actuator, such as a hydraulic or pneumatic cylinder. However, in alternative embodiments, each actuator 106 may correspond to any other suitable type of actuator, such as an electric linear actuator.

It should be appreciated that the configuration of the work vehicle 10 and the agricultural implement 12 described above and shown in FIGS. 1 and 2 is provided only to place the present subject matter in an exemplary field of use. Thus, it should be appreciated that the present subject matter may be readily adaptable to any manner of agricultural machine configuration.

Figure 3:
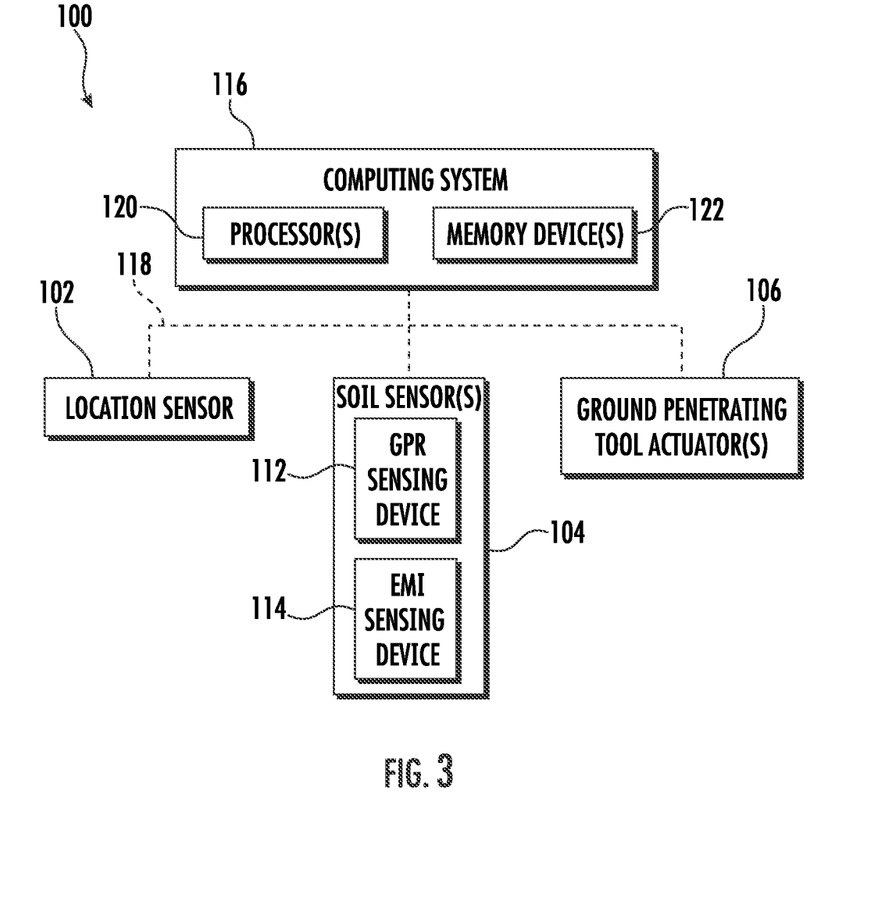
FIG. 3 illustrates a schematic view of one embodiment of a system for identifying soil layers within a field in accordance with aspects of the present subject matter.

Referring now to FIG. 3, a schematic view of one embodiment of a system 100 for identifying subsurface soil layers is illustrated in accordance with aspects of the present subject matter. In general, the system 100 will be described herein with reference to the work vehicle 10 and the agricultural implement 12 described above with reference to FIGS. 1 and 2. However, it should be appreciated by those of ordinary skill in the art that the disclosed system 100 may generally be utilized with work vehicles having any other suitable vehicle configuration and/or agricultural implements having any other suitable implement configuration.

As shown in FIG. 3, the system 100 may include one or more soil sensors 104 provided in operative association with the vehicle 10 and/or the implement 12. In general, as mentioned above, the soil sensor(s) 104 may be configured to capture data indicative of a subsurface soil layer (e.g., a compaction layer or the B-horizon) present within the field as the vehicle/implement 10/12 travels across the field. As such, in several embodiments, each soil sensor 104 may include a ground-penetrating radar (GPR) sensing device 112 and electromagnetic induction (EMI) sensing device 114. In such embodiments, the GPR sensing device(s) 112 may be configured to capture GPR data associated with the soil present within the field of view or sensor detection range of the GPR sensing device(s) 112. Similarly, the EMI sensing device(s) 114 may be configured to capture EMI data associated with the soil present within the field of view or sensor detection range of the EMI sensing device(s) 114. As will be described below, the captured GPR and/EMI data may be used to determine the thickness of the subsurface soil, which, in turn, allows the surface soil layer to be identified as either a compaction layer or the B-horizon.

The combination of GPR and EMI data may improve the accuracy of the subsurface soil layer depiction. For example, the GPR data may generally provide a more accurate representation of shallower subsurface soil layers than the EMI data. Conversely, the EMI data may generally provide a more accurate representation of deeper subsurface soil layers than the GPR data. Thus, the combination of GPR and EMI data allows for more accurate thickness determinations as the depths of the subsurface soil layer varies. Moreover, the combination of GPR and EMI data may allow a three-dimensional representation of the soil to be generated (that could not be generated by GPR or EMI data alone). As will be described below, in some embodiments, the three-dimensional representation may be used to determine the thickness of the subsurface soil layer. However, in alternative embodiments, each soil sensor 104 may include only the GPR sensing device 112 or the EMI sensing device 114

The GPR sensing device(s) 112 may correspond to any suitable sensor(s) or sensing device(s) configured to capture data associated with the soil within the field using radio waves. For example, the GPR sensing device(s) 112 may be configured to emit one or more radio wave output signals directed toward a portion of the soil within its field of view or sensor detection zone. A portion of the output signal(s) may, in turn, be reflected by the subsurface soil layer as an echo signal(s). Moreover, the GPR sensing device(s) 112 may be configured to receive the reflected echo signal(s). In this regard, the time of flight, amplitude, frequency, and/or phase of the received echo signal(s) may be used to determine the thickness of and/or other parameters (e.g., density) associated with the subsurface soil layer. Furthermore, in one embodiment, the time of flight, amplitude, frequency, and/or phase of the received echo signal(s) may be used (in combination with the EMI data) to generate the three-dimensional representation.

In addition, the EMI sensing device(s) 114 may correspond to any suitable sensor(s) or sensing device(s) configured to capture data associated with the soil within the field using electromagnetic induction. For example, each EMI sensing device 114 may include a coil(s) or other inductor(s). In this respect, as the vehicle/implement 10/12 travels across the field, the compaction layer may induce a current within the coil(s). The current may, in turn, vary with the parameters of the compaction layer (e.g., the position of the top and/or bottom surfaces, thickness, density, and/or the like). As such, the induced current may be used to determine the thickness of and/or other parameters associated with the subsurface soil layer. Additionally, in one embodiment, the induced current may be used (in combination with the GPR data) to generate the three-dimensional representation.

However, in alternative embodiments, the soil sensor(s) 104 may be configured as any other suitable sensor(s) or sensing device(s) configured to capture data that can be used to determine the thickness of a subsurface soil layer as the vehicle/implement 10/12 travels across the field. Furthermore, in some embodiments, the soil sensor 104 may be moved across the field on a device or vehicle (e.g., an all-terrain vehicle) other than the vehicle 10 and/or the implement 12.

In accordance with aspects of the present subject matter, the system 100 may include a computing system 116 communicatively coupled to one or more components of the vehicle 10, the implement 12, and/or the system 100 to allow the operation of such components to be electronically or automatically controlled by the computing system 116. For instance, the computing system 116 may be communicatively coupled to the location sensor 102 via a communicative link 118. As such, the computing system 116 may be configured to receive location data from the location sensor 102 that is indicative of the location of the vehicle/implement 10/12 within the field. Furthermore, the computing system 116 may be communicatively coupled to the soil sensor(s) 104 via the communicative link 118. As such, the computing system 116 may be configured to receive data from the soil sensor(s) 104 that is indicative of a subsurface soil layer present within the field as the vehicle/implement 10/12 travels across the field. Moreover, the computing system 116 may be communicatively coupled to the ground-penetrating tool actuator(s) 106 via the communicative link 118. In this respect, the computing system 116 may be configured to control the operation of the ground-penetrating tool actuator(s) 106 in a manner that controls the penetration depth(s) of the associated ground-penetrating tool(s) (e.g., the shanks 38). Additionally, the computing system 116 may be communicatively coupled to any other suitable components of the vehicle 10, the implement 12, and/or the system 100.

In general, the computing system 116 may comprise one or more processor-based devices, such as a given controller or computing device or any suitable combination of controllers or computing devices. Thus, in several embodiments, the computing system 116 may include one or more processor(s) 120 and associated memory device(s) 122 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 122 of the computing system 116 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 122 may generally be configured to store suitable computer-readable instructions that, when implemented by the processor(s) 120, configure the computing system 116 to perform various computer-implemented functions, such as one or more aspects of the methods and algorithms that will be described herein. In addition, the computing system 116 may also include various other suitable components, such as a communications circuit or module, one or more input/output channels, a data/control bus and/or the like.

The various functions of the computing system 116 may be performed by a single processor-based device or may be distributed across any number of processor-based devices, in which instance such devices may be considered to form part of the computing system 116. For instance, the functions of the computing system 116 may be distributed across multiple application-specific controllers or computing devices, such as a vehicle controller, an implement controller, a navigation controller, and/or the like.

Figure 4:
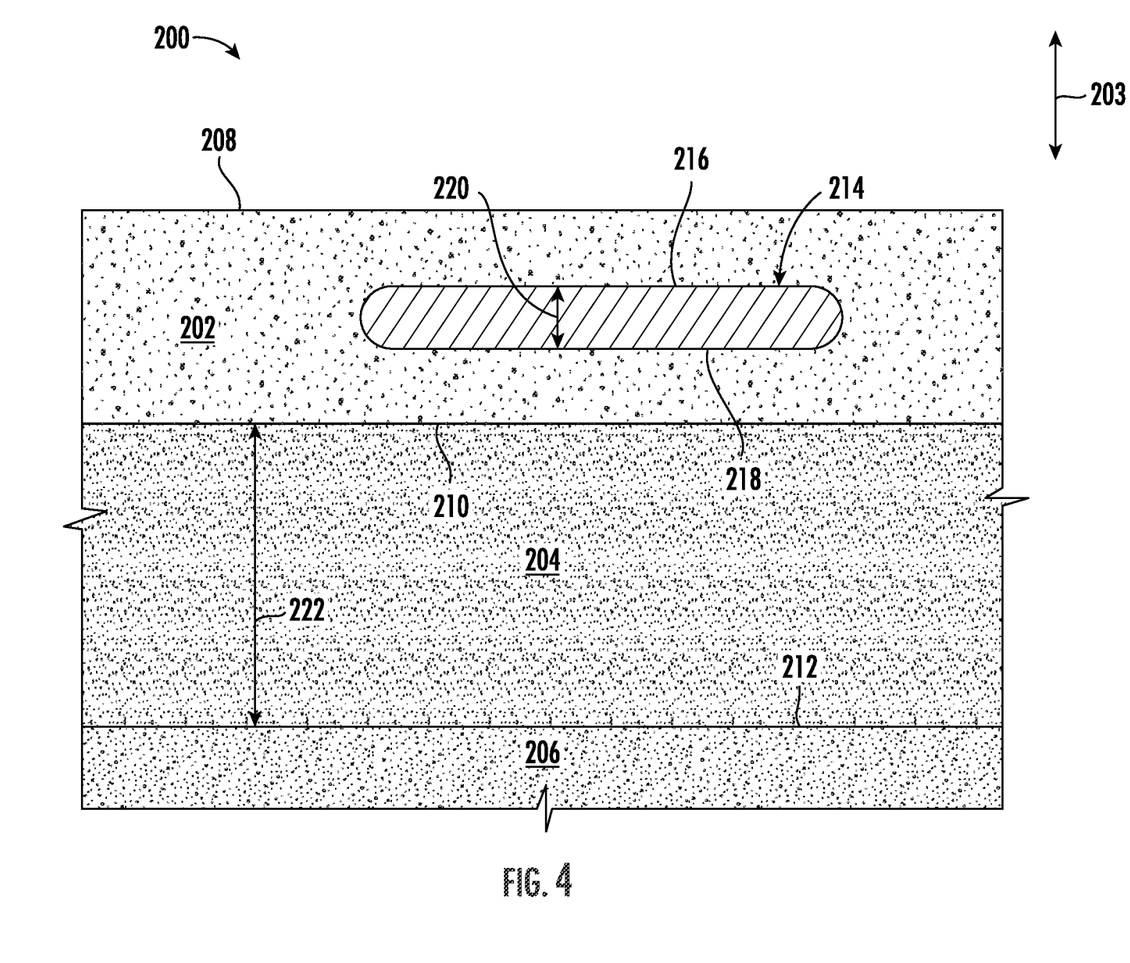
FIG. 4 illustrates an example cross-sectional view of a portion of the soil within an agricultural field in accordance with aspects of the present subject matter, particularly illustrating various subsurface soil layers with the portion of the soil.

Referring now to FIG. 4, an example cross-sectional view of a portion of the soil within an agricultural field 200 is illustrated in accordance with aspects of the present subject matter. As shown, the illustrated portion of the field 200 includes an A-horizon 202, a B-horizon 204 positioned below the A-horizon 202 in a vertical direction (indicated by arrow 203), and a C-horizon 206 positioned below the B-horizon 204 in the vertical direction 203. More specifically, the A-horizon 202 extends from a top surface 208 of the field 200 downward in the vertical direction 203 to an A-B horizon interface 210. As such, the A-horizon 202 forms the topsoil of the field 200 and primarily contains dark decomposed organic matter (sometimes called humus). In general, the A-horizon 202 includes the most organic matter of the soil within the field and is suitable for planting. Thus, the seedbed being formed by a tillage operation is formed within the A-horizon 202. Furthermore, the B-horizon 204 extends from A-B horizon interface 210 downward in the vertical direction 203 to a B-C horizon interface 212 such that the B-horizon 204 has a thickness 222. As such, the B-horizon 204 forms the subsoil of the field 200 and primarily contains clay minerals, iron oxides, and/or gravel, with little organic matter. In addition, the C-horizon 206 extends in the vertical direction 203 from the B-C horizon interface 212 downward in the vertical direction 203 to the bedrock (not shown). As such, the C-horizon 206 forms the substratum of the field 200 and primarily contains weathered bedrock and carbonates. In this respect, the B- and C-horizons 204, 206 are generally unsuitable for planting. Thus, it is generally desirable for the ground-penetrating tool(s) (e.g., the shank(s) 38) of the implement 12 to positioned above the B-horizon 204 to prevent clay from being mixed into the seedbed.

Moreover, the illustrated portion of the field 200 includes a compaction layer 214. As shown in FIG. 4, the compaction layer 214 defines a thickness 220 extending between a top surface 216 of the compaction layer 214 and a bottom surface 218 of the compaction layer 214 in the vertical direction 203. The top surface 216 of the compaction layer 214 is, in turn, positioned below the top surface 208 of the field 200, while the bottom surface 218 of the compaction layer 214 is positioned above the A-B horizon interface 210. In general, the compaction layer 214 is a portion of the soil within the A-horizon 202 that breaks down and compacts due to vehicle traffic, ponding, and/or the like. As such, the soil within the compaction layer 214 is much denser than the surrounding soil within the A-horizon 202. Thus, it is difficult from the roots of the crops planted within the field to penetrate into the compaction layer 214. In this respect, it is generally desirable for the ground-penetrating tool(s) (e.g., the shank(s) 38) of the implement 12 to penetrate through the compaction layer 214 to fully fracture the compaction layer 214 during a tillage operation.

In general, the thickness of a B-horizon is greater than the thickness of a compaction layer. For example, as shown in FIG. 4, the thickness 222 of the B-horizon 204 is much greater than the thickness 220 of the compaction layer 214. In this respect, as will be described below, the thickness of a subsurface soil layer can be used to identify it as a compaction layer or the B-horizon. Thus, using subsurface soil layer thickness allows for identification of the layer as either a compaction layer or the B-horizon even as the depth of compaction layers and B-horizon varies throughout a field.

Figure 5:
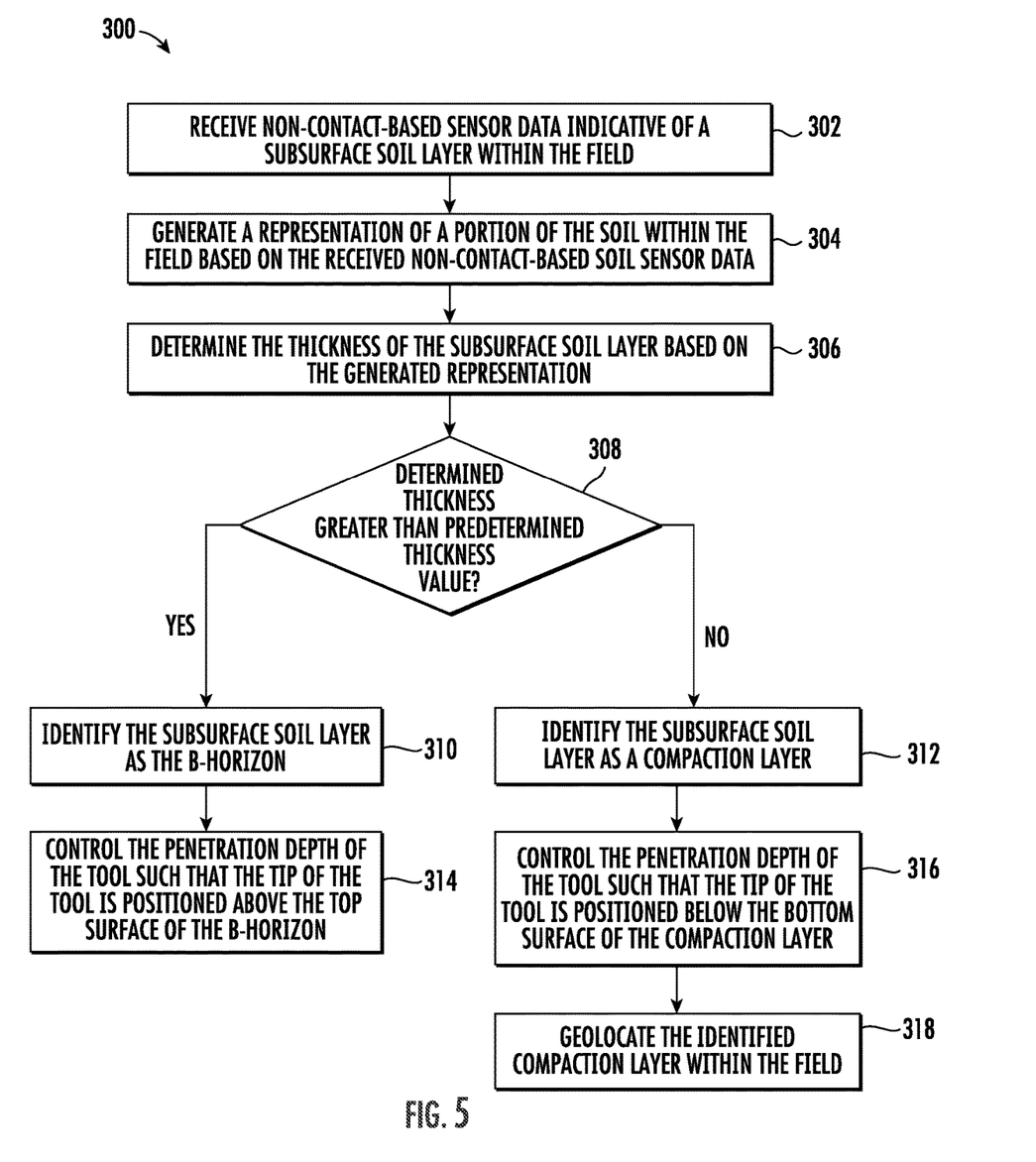
FIG. 5 illustrates a flow diagram providing one embodiment of example control logic for identifying soil layers within a field in accordance with aspects of the present subject matter.

Referring now to FIG. 5, a flow diagram of one embodiment of example control logic 300 that may be executed by the computing system 116 (or any other suitable computing system) for identifying subsurface soil layers is illustrated in accordance with aspects of the present subject matter. Specifically, the control logic 300 shown in FIG. 5 is representative of steps of one embodiment of an algorithm that can be executed to identify subsurface soil layers accurately, thereby improving the quality of a tillage operation as field conditions vary. Thus, in several embodiments, the control logic 300 may be advantageously utilized in association with a system installed on or forming part of a tillage implement to allow for real-time control of the implement without requiring substantial computing resources and/or processing time. However, in other embodiments, the control logic 300 may be used in association with any other suitable system, application, and/or the like for identifying soil layers.

As shown in FIG. 5, at (302), the control logic 300 includes receiving non-contact-based sensor data indicative of a subsurface soil layer within a field. For example, as indicated above, the computing system 116 may be communicatively coupled to the soil sensor(s) 104 of the implement 12 via the communicative link 118. In this respect, as the implement 12 travels across a field to perform a tillage operation on the field, the computing system 116 may be configured to receive data from the soil sensor(s) 104 that is indicative of a subsurface soil layer present within the field.

Furthermore, at (304), the control logic 300 includes generating a representation of a portion of the soil within the field based on the received non-contact-based sensor data. Specifically, in several embodiments, the computing system 116 may be configured to analyze/process the received sensor data (e.g., the sensor data received at (302)) to generate a representation of a portion of the soil within the field. As such, the computing system 116 may include a suitable algorithm(s) stored within its memory device(s) 122 that, when executed by the processor(s) 120, generates the representation from the data received from the sensor(s) 104 (e.g., the GPR data captured by the GPR sensing device 112 and the EMI data captured by the EMI sensing device 114).

The representation of the portion of the soil within the field may correspond to any suitable data structure depicts or otherwise provides an indication of the soil structure adjacent to the top surface of the field based on the received soil sensor data. For example, in several embodiments, the representation of the soil may correspond to a two-dimensional or three-dimensional image(s) or spatial model illustrating or depicting one or more subsurface soil layers. In this respect, the generated three-dimensional representation may provide an indication of various parameters associated with one or more subsurface soil layers present within the field across which the vehicle/implement 10/12 is traveling. For example, such parameters may include the position or depth of the bottom and/or top surface of the subsurface soil layer(s) relative to the top surface of the field, the thickness of the subsurface soil layer(s), and/or the like. However, in alternative embodiments, the three-dimensional representation of the soil may correspond to any other suitable type of data structure, such as one-dimensional representation or dataset.

Additionally, at (306), the control logic 300 includes determining the thickness of the subsurface soil layer based on the generated representation of the field. For example, in one embodiment, the computing system 116 may be configured to analyze the generated representation of the field (e.g., the representation generated at (304)) to the determine the thickness of the subsurface soil layer. In such an embodiment, the computing system 116 may use any suitable technique(s) or algorithm(s) to the determine the thickness of the subsurface soil layer based on the generated representation. Alternatively, in other embodiments, the computing system 116 may determine the thickness of the subsurface soil layer directly based on the received soil sensor data (e.g., the sensor data received at (302)). For example, in such embodiments, the computing system 116 may determine the thickness of the subsurface soil layer based on the time of flight of the signal(s) emitted by the GPR sensing device(s) 112 and/or the induced current within the EMI sensing device(s) 114.

Moreover, as shown in FIG. 5, at (308), the control logic 300 includes comparing the determined thickness to a predetermined thickness value. More specifically, the computing system 116 may compare the determined thickness of the subsurface soil layer (e.g., the thickness determined at (306)) to a predetermined thickness value. As mentioned above, the thickness of a B-horizon is generally greater than the thickness of a compaction layer. In this respect, when the determined thickness exceeds to the predetermined thickness value, the computing system 116 may identify (e.g., at (310)) the subsurface soil layer as the B-horizon. Conversely, when the determined thickness is equal to or falls below to the predetermined thickness value, the computing system 116 may identify (e.g., at (312)) the subsurface soil layer as a compaction layer.

In certain instances, the computing system 116 may be unable to determine the thickness of the subsurface soil layer (e.g., at (306)). For example, the subsurface soil layer may extend far enough below the top surface of the field such that the soil sensor 104 is unable to detect the bottom of the layer. In such instances, the computing system 116 may identify the subsurface soil layer as the B-horizon because compaction layers are rarely deep enough that the soil sensor 104 is unable to detect the bottom.

In addition, at (314), when the subsurface soil layer is identified as the B-horizon, the control logic 300 includes controlling the penetration depth of a ground-engaging tool of a tillage implement such that the tip of the tool is positioned above the top surface of the B-horizon. Specifically, in such instances, the computing system 116 may be configured to control the penetration depth(s) of one or more ground-penetrating tools of the implement 12 such that the tool(s) do not penetrate into the identified B-horizon. For example, in some embodiments, the computing system 116 may transmit control signals to the ground-penetrating tool actuator(s) 106. The control signals may, in turn, instruct the actuator(s) 106 to adjust the penetration depth(s) of the tip(s) 48 of the shank(s) 38 such that the tip(s) 48 is positioned above the top surface of the identified B-horizon (e.g., the A-B horizon interface 210 shown in FIG. 4). Such positioning of the shank(s) 48 may, in turn, prevent the shank(s) 48 from mixing clay from the identified B-horizon into the seedbed, thereby improving the quality of the seedbed being prepared by the implement 12.

Alternatively, at (316), when the subsurface soil layer is identified as a compaction layer, the control logic 300 includes controlling the penetration depth of the ground-engaging tool such that the tip of the tool is positioned below the bottom surface of the compaction layer. Specifically, in such instances, the computing system 116 may be configured to control the penetration depth(s) of one or more ground-penetrating tools of the implement 12 such that the tool(s) penetrate through the identified compaction layer. For example, in some embodiments, the computing system 116 may transmit control signals to the ground-penetrating tool actuator(s) 106. The control signals may, in turn, instruct the actuator(s) 106 to adjust the penetration depth(s) of the tip(s) 48 of the shank(s) 38 such that the tip(s) 48 is positioned below the bottom surface of the identified compaction layer (e.g., the surface 218 shown in FIG. 4). Such positioning of the shank(s) 48 may, in turn, provide better fracturing of the identified compaction layer, thereby improving the quality of the seedbed being prepared by the implement 12.

Furthermore, at (318), when the subsurface soil layer is identified as a compaction layer, the control logic 300 includes geo-locating the identified compaction layer within the field. More specifically, as the vehicle/implement 10/12 travels across the field, the computing system 116 may be configured to receive location data (e.g., coordinates) from the location sensor 102 (e.g., via the communicative link 118). Based on the known dimensional configuration and/or relative positioning between the soil sensor(s) 104 and the location sensor 102, the computing system 116 may geo-locate each identified compaction layer within the field. For example, in one embodiment, the coordinates derived from the location sensor 102 and the compaction layer identifications may both be time-stamped. In such an embodiment, the time-stamped data may allow the compaction layer identifications to be matched or correlated to a corresponding set of location coordinates received or derived from the location sensor 102. Moreover, in some embodiments, the computing system 116 may be configured to generate a field map identifying one or more locations within the field at which the subsurface soil layer is identified as a compaction layer. Additionally, the computing system 116 may be configured to geolocate and/or map any other suitable parameters associated with the detected subsurface soil layer, such as the thickness of the layer and/or locations where the subsurface soil layer is identified as the B-horizon.

Figure 6:
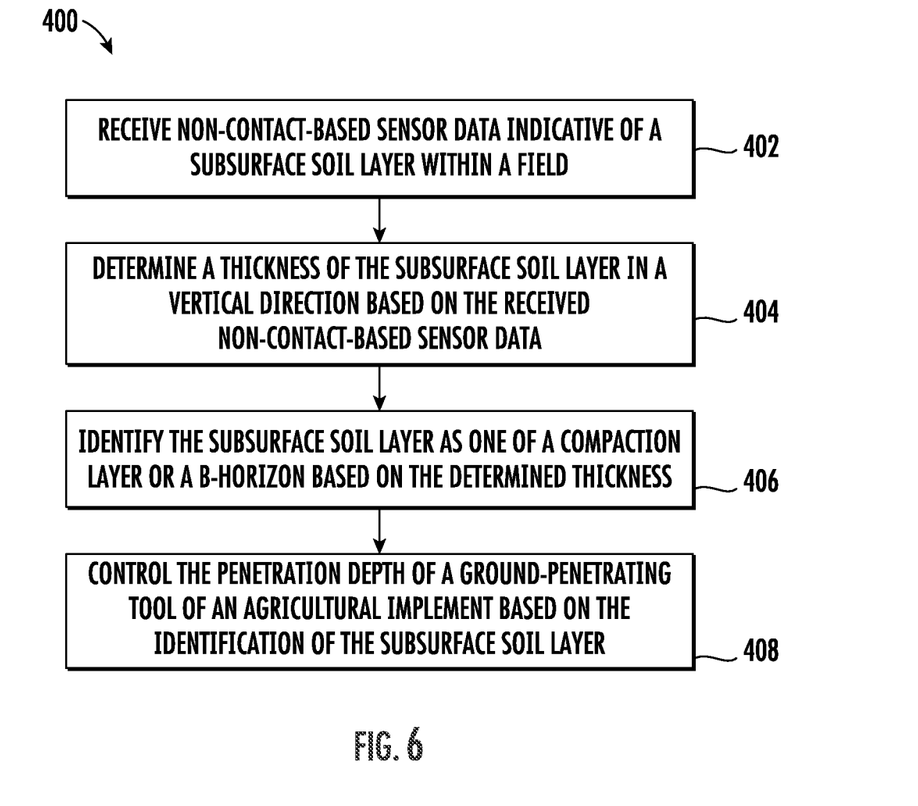
FIG. 6 illustrates a flow diagram of one embodiment of a method for identifying soil layers within a field in accordance with aspects of the present subject matter.

Referring now to FIG. 6, a flow diagram of one embodiment of a method 400 for identifying subsurface soil layers is illustrated in accordance with aspects of the present subject matter. In general, the method 400 will be described herein with reference to the work vehicle 10, the agricultural implement 12, and the system 100 described above with reference to FIGS. 1-3. However, it should be appreciated by those of ordinary skill in the art that the disclosed method 400 may generally be implemented with any work vehicle having any suitable vehicle configuration, any agricultural implement having any suitable implement configuration and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (402), the method 400 may include receiving, with a computing system, non-contact-based sensor data indicative of a subsurface soil layer present within a field. For instance, as described above, the computing system 116 may receive data from the soil sensor(s) 104 of the vehicle/implement 10/12 as the vehicle/implement 10/12 travels across a field to perform a tillage operation. Such non-contact-based sensor data may, in turn, be indicative of a subsurface soil layer (e.g., a compaction layer or the B-horizon).

Additionally, at (404), the method 400 may include determining, with the computing system, a thickness of the subsurface soil layer in a vertical direction based on the received non-contact-based sensor data. For instance, as described above, the computing system 116 may be configured to determine the thickness of the subsurface soil layer in the vertical direction based on the received non-contact-based sensor data.

Moreover, as shown in FIG. 6, at (406), the method 400 may include identifying, with the computing system, the subsurface soil layer as one of a compaction layer or a B-horizon based on the determined thickness. For instance, as described above, the computing system 116 may be configured to identify the subsurface soil layer either a compaction layer or the B-horizon based on the determined thickness.

Furthermore, at (408), the method 400 may include controlling, with the computing system, the penetration depth of a ground-penetrating tool of an agricultural implement based on the identification of the subsurface soil layer. For instance, as described above, the computing system 116 may be configured to the operation of the ground-penetrating tool actuator(s) 106 in a manner that adjusts the penetration depth(s) of the shank(s) 38 of the implement 12 based on the identification of the subsurface soil layer.

It is to be understood that the steps of the control logic 300 and the method 400 are performed by the computing system 116 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 116 described herein, such as the control logic 300 and the method 400, is implemented in software code or instructions which are tangibly stored on a tangible computer readable medium. The computing system 116 loads the software code or instructions via a direct interface with the computer readable medium or via a wired and/or wireless network. Upon loading and executing such software code or instructions by the computing system 116, the computing system 116 may perform any of the functionality of the computing system 116 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for identifying soil layers within a field, the system comprising:
   a non-contact-based sensor configured to capture data indicative of a subsurface soil layer within the field, and
   a computing system communicatively coupled to the non-contact-based sensor, the computing system configured to:
      determine a thickness of the subsurface soil layer in a vertical direction based on the data captured by the non-contact-based sensor; and
      compare the determined thickness to a predetermined thickness value;
      identify the subsurface soil layer as the compaction layer when the determined thickness falls below the predetermined thickness value; and
      identify the subsurface soil layer as the B-horizon when the determined thickness exceeds the predetermined thickness value.

2. The system of claim 1, further comprising:
   a ground-penetrating tool configured to penetrate soil within a field to a penetration depth,
   wherein the computing system is further configured to control the penetration depth of the ground-penetrating tool based on the identification of the subsurface soil layer.

3. The system of claim 2, wherein, when the subsurface soil layer is identified as the B-horizon, the computing system is further configured to control the penetration depth of the ground-penetrating tool such that a tip of the ground-penetrating tool is positioned above a top surface of the B-horizon in the vertical direction.

4. The system of claim 2, wherein, when the subsurface soil layer is identified as the compaction layer, the computing system is further configured to control the penetration depth of the ground-penetrating tool such that a tip of the ground-penetrating tool is positioned below a bottom surface of the compaction layer in the vertical direction.

5. The system of claim 2, wherein the ground-penetrating tool comprises a shank.

6. The system of claim 1, wherein the computing system is further configured to:
   generate a representation of a portion of the soil within the field based on the data captured by the sensor; and
   determine the thickness of the subsurface soil layer based on the generated representation.

7. The system of claim 1, wherein the sensor comprises a ground-penetrating radar sensing device and an electromagnetic induction sensing device.

8. The system of claim 1, wherein the computing system is further configured to generate a field map identifying one or more locations within the field at which the subsurface soil layer is identified as the compaction layer.

9. The system of claim 1, wherein the sensor is installed on an agricultural implement configured to perform an agricultural operation on the field.

10. A method for identifying soil layers within a field as an agricultural implement travels across the field, the agricultural implement including a ground-penetrating tool configured to penetrate soil within a field to a penetration depth, the method comprising:
    receiving, with a computing system, non-contact-based sensor data indicative of a subsurface soil layer within the field;
    determining, with the computing system, a thickness of the subsurface soil layer in a vertical direction based on the received non-contact-based sensor data;
    comparing, with the computing system, the determined thickness to a predetermined thickness value;
    identifying, with the computing system, the subsurface soil layer as the compaction layer when the determined thickness falls below the predetermined thickness value;
    identifying, with the computing system, the subsurface soil layer as the B-horizon when the determined thickness exceeds the predetermined thickness value; and
    controlling, with the computing system, the penetration depth of the ground-penetrating tool based on the identification of the subsurface soil layer.

11. The method of claim 10, wherein, when the subsurface soil layer is identified as the B-horizon, controlling the penetration depth of the ground-penetrating tool comprises controlling, with the computing system, the penetration depth of the ground-penetrating tool such that a tip of the ground-penetrating tool is positioned above a top surface of the B-horizon in the vertical direction.

12. The method of claim 10, wherein, when the subsurface soil layer is identified as the compaction layer, controlling the penetration depth of the ground-penetrating tool comprises controlling, with the computing system, the penetration depth of the ground-penetrating tool such that a tip of the ground-penetrating tool is positioned below a bottom surface of the compaction layer in the vertical direction.

13. The method of claim 10, wherein the ground-penetrating tool comprises a shank.

14. The method of claim 10, wherein determining the thickness of the subsurface soil layer comprises:
generating, with the computing system, a representation of a portion of the soil within the field based on the received non-contact-based soil sensor data; and
determining, with the computing system, the thickness of the subsurface soil layer based on the generated representation.

15. The method of claim 10, wherein receiving the non-contact-based sensor data comprises receiving, with the computing system, ground-penetrating radar data and electromagnetic induction sensor data.

16. The method of claim 10, further comprising:
generating, with the computing system, a field map identifying one or more locations within the field at which the subsurface soil layer is identified as the compaction layer.

* * * * *